United States Patent
Jacobs (10) Patent No.: US 8,427,479 B2
(45) Date of Patent: Apr. 23, 2013

(54) SYSTEMS AND METHODS FOR DETERMINING A LOCATION OF STATIONS IN A PRINT SHOP

(75) Inventor: Timothy Wayne Jacobs, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 608 days.

(21) Appl. No.: 12/692,319

(22) Filed: Jan. 22, 2010

(65) Prior Publication Data

US 2011/0181596 A1 Jul. 28, 2011

(51) Int. Cl.
G06Q 10/06 (2006.01)
G06F 3/1204 (2006.01)
G06F 3/1211 (2006.01)
G06F 3/126 (2006.01)
G06F 3/1275 (2006.01)

(52) U.S. Cl.
USPC ........... 345/440; 345/441; 345/442; 345/443; 358/1.13; 358/1.15; 358/1.18

(58) Field of Classification Search .......... 345/440–443; 358/1.13, 1.15, 1.18
See application file for complete search history.

(56) References Cited

U.S. PATENT DOCUMENTS

| | | | |
|---|---|---|---|
| 6,529,286 B1 * | 3/2003 | King | 358/1.14 |
| 8,134,728 B2 * | 3/2012 | Steele et al. | 358/1.15 |
| 8,203,738 B2 * | 6/2012 | Hibino et al. | 358/1.15 |
| 8,270,021 B2 | 9/2012 | Jacobs | |
| 2005/0015392 A1 * | 1/2005 | Tonkin | 707/100 |
| 2006/0244991 A1 * | 11/2006 | Tenger et al. | 358/1.15 |
| 2010/0100323 A1 * | 4/2010 | Gnanasambandam et al. | 701/300 |
| 2010/0245886 A1 * | 9/2010 | Okajima et al. | 358/1.15 |

OTHER PUBLICATIONS

Khaewsukkho, "New Approaches for Design of High-Mix Low-Volume Facilities" dissertation, The Ohio State University 2008, Chapter 3, p. 32 and Chapter 5, p. 102.
Wu, "A Concurrent Approach to Cell Formation and Assignment of Identical Machines in Group Technology", Int. J. Prod. Res., 1998, vol. 36, No. 8, pp. 2099-2114.

* cited by examiner

*Primary Examiner* — Xiao M. Wu
*Assistant Examiner* — Todd Buttram
(74) *Attorney, Agent, or Firm* — Fox Rothschild LLP (57) ABSTRACT

A system for determining a location of stations in a cell of a job shop may include a computing device and a computer-readable storage medium in communication with the computing device. The computer-readable storage medium may include one or more programming instructions for receiving information corresponding to a workflow of a cell in a job shop. The information may include a plurality of print-related functions performable by the cell and an amount of work associated with one or more pairs of print-related functions. The computer-readable storage medium may include one or more programming instructions for identifying a plurality of stations in the cell, determining a target distance between one or more pairs of stations, generating a visual depiction of the identified stations, automatically applying the visual depiction to a floor plan, and displaying the visual depiction as applied to the floor plan to a user.

19 Claims, 5 Drawing Sheets

SYSTEMS AND METHODS FOR DETERMINING A LOCATION OF STATIONS IN A PRINT SHOP

BACKGROUND

Manufacturing stations in a cell are usually positioned to minimize the time associated with transportation between cells. However, there are many factors to consider in developing a cell layout, such as station size, facilities, structural elements and power considerations. These factors can play a significant role in cell layout due to the prohibitive cost associated with changing existing building infrastructures.

SUMMARY

This invention is not limited to the particular systems, methodologies or protocols described, as these may vary. The terminology used in this document is for the purpose of describing particular embodiments only, and is not intended to limit the scope of the present disclosure which will be limited only by the appended claims.

As used in this document, the singular forms "a," "an," and "the" include plural reference unless the context clearly dictates otherwise. Unless defined otherwise, all technical and scientific terms used in this document have the same meanings as commonly understood by one of ordinary skill in the art. As used herein, the term "comprising" means "including, but not limited to."

In an embodiment, a system for determining a location of stations in a cell of a job shop may include a computing device and a computer-readable storage medium in communication with the computing device. The computer-readable storage medium may include one or more programming instructions for receiving information corresponding to a workflow of a cell in a job shop. The information may include a plurality of print-related functions performable by the cell and an amount of work associated with one or more pairs of print-related functions. The computer-readable storage medium may include one or more programming instructions for identifying a plurality of stations in the cell. Each station may include one or more print production devices configured to perform one or more of the print-related functions performable by the cell. The computer-readable storage medium may include one or more programming instructions for determining a target distance between one or more pairs of stations, where the target distance may be based on at least the amount of work associated with the pair of stations, generating a visual depiction of the identified stations, automatically applying the visual depiction to a floor plan corresponding to the cell, based on one or more of the determined target distances, and displaying the visual depiction as applied to the floor plan to a user.

In an embodiment, a system for determining a location of stations in a cell of a job shop may include a computing device and a computer-readable storage medium in communication with the computing device. The computer-readable storage medium may include one or more programming instructions for receiving information corresponding to a workflow of a cell in a job shop. The information may include a plurality of print-related functions performable by the cell and an amount of work associated with one or more pairs of print-related functions. The computer-readable storage medium may include one or more programming instructions for identifying a plurality of stations in the cell, where each station includes one or more print production devices configured to perform one or more of the print-related functions performable by the cell, and determining a target distance between one or more pairs of stations, where the target distance may be based on at least the amount of work associated with the pair of stations. The computer-readable storage medium may include one or more programming instructions for generating a graph including one or more nodes and one or more edges, where each node may correspond to a different station in the cell, each edge may represent a path between a pair of nodes, and each edge may correspond to a distance between the pair of nodes. The computer-readable storage medium may include one or more programming instructions for displaying the graph and a floor plan corresponding to the cell to a user and enabling the user to change a position of one or more of the nodes and the edges of the graph on the floor plan.

In an embodiment, a system for determining a location of stations in a cell of a job shop may include a computing device and a computer-readable storage medium in communication with the computing device. The computer-readable storage medium may include one or more programming instructions for receiving information corresponding to a workflow of a cell in a job shop, where the information may include a plurality of functions performable by the cell and an amount of work associated with one or more pairs of functions. The computer-readable storage medium may include one or more programming instructions for identifying a plurality of stations in the cell, where each station may include one or more production devices configured to perform one or more of the functions performable by the cell. The computer-readable storage medium may include one or more programming instructions for determining a target distance between each unique pair of stations, where the target distance may be based on at least the amount of work associated with the pair of stations. The computer-readable storage medium may include one or more programming instructions for generating a visual depiction of the identified stations, automatically applying the visual depiction to a floor plan corresponding to the cell based on one or more of the determined target distances, and displaying the visual depiction as applied to the floor plan to a user.

DETAILED DESCRIPTION

For purposes of the discussion below, a "job shop" refers to a production environment that processes jobs. A job shop may be a freestanding entity or it may be part of a corporation or other entity. Additionally, a job shop may communicate with one or more servers by way of a local area network or a wide area network, such as the Internet, the World Wide Web or the like. A job shop may include a document production environment. A document production environment may be an environment that includes a plurality of document production devices, such as printers, cutters, collators and the like.

A "job" refers to a logical unit of work that is to be completed for a customer. For example, a job may include pages, batches, units and/or the like. A job may include one or more print jobs from one or more clients. Although the disclosed embodiments pertain to document production environments, the disclosed methods and systems can be applied to production systems in general.

A "print job" refers to a job processed in a document production environment. For example, a print job may include producing credit card statements corresponding to a certain credit card company, producing bank statements corresponding to a certain bank, printing a document or the like.

A "cell" is a grouping of one or more machines, devices, document production devices and/or the like used to process at least a portion of a job, a print job and/or the like. A job shop may include one or more cells.

Figure 1:
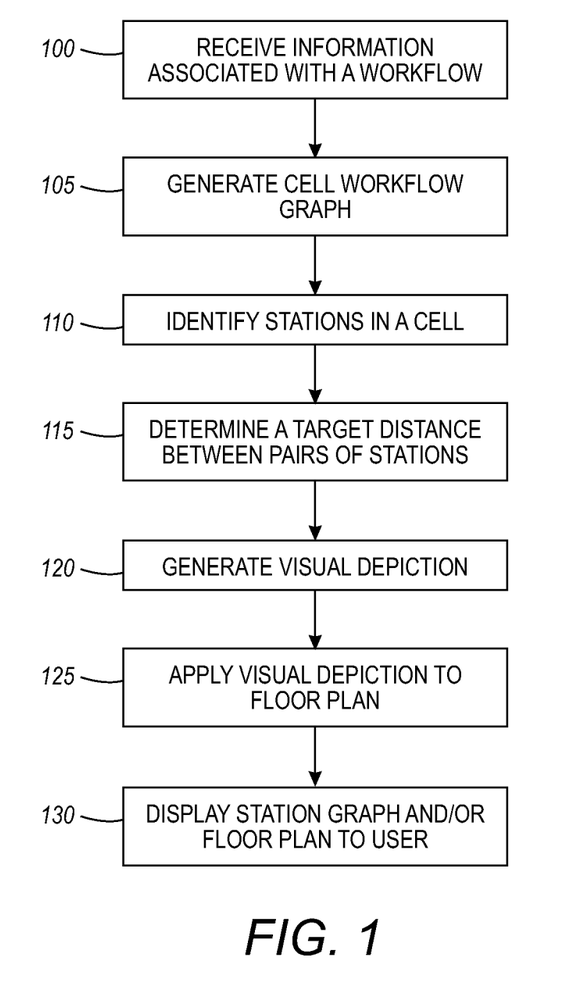
FIG. 1 illustrates an exemplary method of determining a cell layout according to an embodiment.

FIG. 1 illustrates an exemplary method of determining a location of stations in a cell of a job shop according to an embodiment. As illustrated by FIG. 1, information associated with a workflow may be received 100. In an embodiment, a workflow is a sequence of one or more functions performed in the processing of a job. A function may be a processing step that is performed on a job. For example, in a document production environment, a function may be printing, scanning, binding, laminating and/or the like. Although this disclosure discusses cell layout in the context of document production environments, it is understood that this disclosure also applies to cell layout for other manufacturing and/or processing environments.

In an embodiment, information associated with a workflow may include one or more functions performed in the workflow, job volume information associated with a pair of functions in the workflow and/or the like. Job volume information may include a logical unit of work associated with one or more jobs. In an embodiment, a job volume may represent the amount of work that flows between two functions of a workflow. A job volume associated with a print job may be the number of pages associated with the print job, a number of batches associated with the print job, a number of units of the print job and/or the like. In an embodiment, job volume information may represent a total job volume processed by a cell over a period of time. Alternatively, job volume information may represent an average job volume processed by a cell over a period of time.

Figure 2:
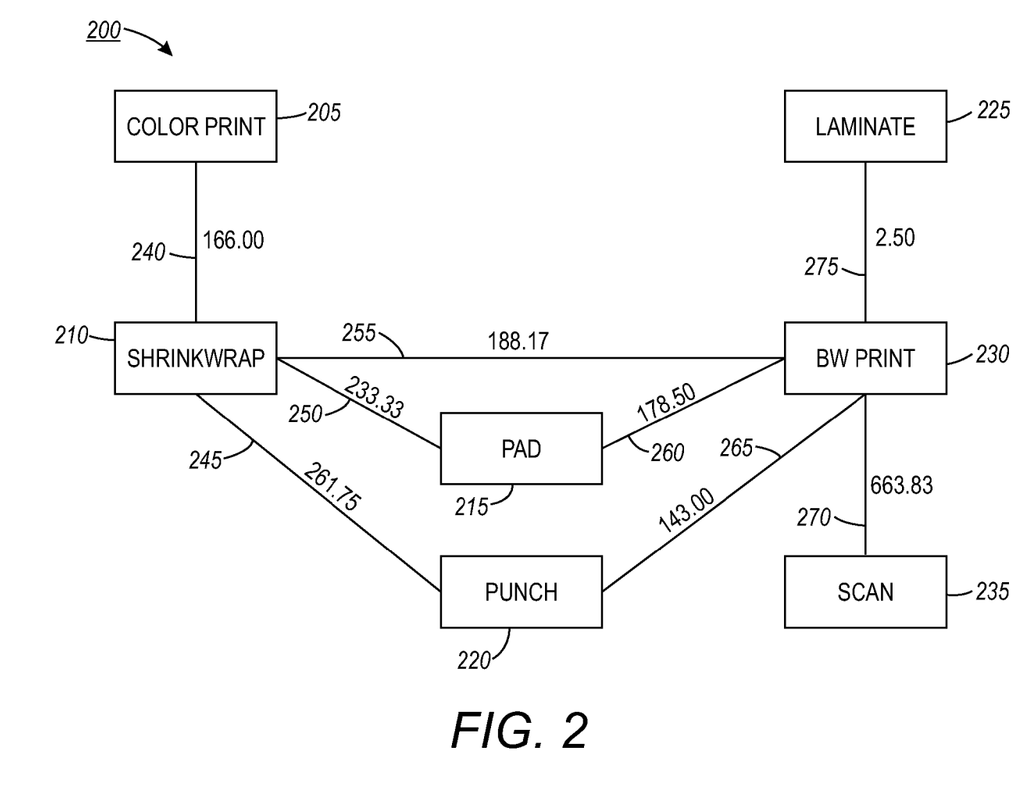
FIG. 2 illustrates an exemplary cell workflow graph according to an embodiment.

In an embodiment, a cell workflow graph may be generated 105 from the received workflow information. A cell workflow graph is a graph corresponding to one or more workflows associated with a cell that depicts one or more functions performable by a cell. FIG. 2 depicts an exemplary cell workflow graph 200 according to an embodiment. As illustrated by FIG. 2, a cell workflow graph 200 may include one or more nodes, such as 205, 210, 215, 220, 225, 230, 235, each corresponding to a different function performable by the cell. For example, the cell workflow graph in FIG. 2 includes a node 205 corresponding to color printing because the representative cell is capable of printing color documents.

As illustrated by FIG. 2, job volume information may be represented in a cell workflow graph as an edge, such as, 240, 245, 250, 255, 260, 265, 270, 275, connecting two nodes. For example, the edge 240 connecting the nodes 205, 210 associated with the color print and shrinkwrap functions indicates that a job volume of 166.00 units of work flows between the two functions in the cell.

In an embodiment, one or more stations in the cell may be identified 110. A station may include one or more pieces of equipment capable of performing one or more functions. In an embodiment, the identified stations may correspond to one or more pieces of equipment that perform one or more of the functions in the received workflow information. In an embodiment, the identified stations may correspond to one or more pieces of equipment that may perform one or more of the functions in a cell workflow graph. For example, the identified stations may correspond to one or more document production devices. In an embodiment, an identified station may correspond to one or more nodes of a cell workflow graph. For example, a color printer station may be identified 110 as providing the color print functionality depicted as a node 205 in the cell workflow graph 200 in FIG. 2. In an embodiment, one or more stations that collectively perform every function in a cell workflow graph may be identified 110. For example, referring to FIG. 2, one or more stations having one or more document production devices that collectively provide color print, shrinkwrap, pad, punch, laminate, black and white print and scan functionality may be identified 110. In an embodiment, a station may perform a plurality of functions. For example, a station may have a document production device that may be capable of performing color printing, black and white printing, scanning and copying.

Table 1 illustrates exemplary stations that may correspond to the nodes identified in FIG. 2 according to an embodiment. For example, as illustrated by Table 1, a laminator may be identified as performing the laminate function identified in FIG. 2.

TABLE 1

| Function | Station |
| --- | --- |
| Black and white print | 6115 Printer |
| Pad | Paddy Wagon |
| Shrinkwrap | Shrinkwrapper |
| Color print | 2045 Printer |
| Punch | 3-5 Hole Punch |
| Scan | Scanner |
| Laminate | Laminator |

In an embodiment, a target distance between each pair of identified stations may be determined 115. In an embodiment, the target distances may be based on the cell area, the flow information and/or the like. In an embodiment, a target distance between two stations may be represented by the following:

$$D_i = (F_{max} - F_i)\left(\frac{D_{max} - D_{min}}{F_{max} - F_{min}}\right) + D_{min},$$

where: $D_i$ is the target distance;
$F_{max}$ is the maximum job volume between any two nodes in the cell workflow graph;
$F_i$ is the job volume between the two nodes in question;
$D_{max}$ is the maximum acceptable distance between any two nodes;
$D_{min}$ is the minimum acceptable distance between any two nodes;
$F_{min}$ is the minimum job volume between any two nodes on the cell workflow graph.

In an embodiment, a user may determine $D_{max}$ and/or $D_{min}$. In an embodiment, $D_{max}$ and/or $D_{min}$ may be based on the number of print production devices in a cell, the type of print production devices in a cell, the physical layout of a cell and/or the like.

Table 2 illustrates target distances between the stations of Table 1 based on the cell workflow graph of FIG. 2, $D_{max}$=12 feet and $D_{min}$=3 feet.

TABLE 2

| Station A | Station B | Job Volume | Target Distance (ft.) |
|---|---|---|---|
| 6115 Printer | Scan | 663.83 | 3.00 |
| 6115 Printer | Paddy Wagon | 178.50 | 9.60 |
| 6115 Printer | 3-5 Hole Punch | 143.00 | 10.09 |
| 6115 Printer | Laminate | 2.50 | 12.00 |
| 6115 Printer | Shrinkwrapper | 188.17 | 9.47 |
| Paddy Wagon | Shrinkwrapper | 233.33 | 8.86 |
| Shrinkwrapper | 3-5 Hole Punch | 261.75 | 8.47 |
| 2045 Printer | Shrinkwrapper | 166.00 | 9.77 |
| Paddy Wagon | 3-5 Hole Punch | 95.00 | 10.74 |

For example, referring to Table 2, the target distance between the 6115 Printer and the Laminator can be determined by the following:

$$D_i = (F_{max} - F_i)\left(\frac{D_{max} - D_{min}}{F_{max} - F_{min}}\right) + D_{min} =$$

$$(663.83 - 2.50)\left(\frac{12 - 3}{663.83 - 2.50}\right) + 3 = 12 \text{ feet}$$

In an embodiment, a visual depiction of one or more stations in a cell, job volume between stations and/or the like may be generated 120. In an embodiment, a visual depiction may be a visual representation of stations in a cell and flow between stations in a cell. A visual depiction may include a graph, a chart, a figure, a table and/or the like. For example, in an embodiment, a graph may be generated 120. The graph may depict one or more stations in a cell and one or more paths between the stations. For example, a graph may be generated 120 by replacing the nodes of a cell workflow graph with nodes representing stations capable of performing the functions represented by the nodes of the cell workflow graph.

Figure 3:
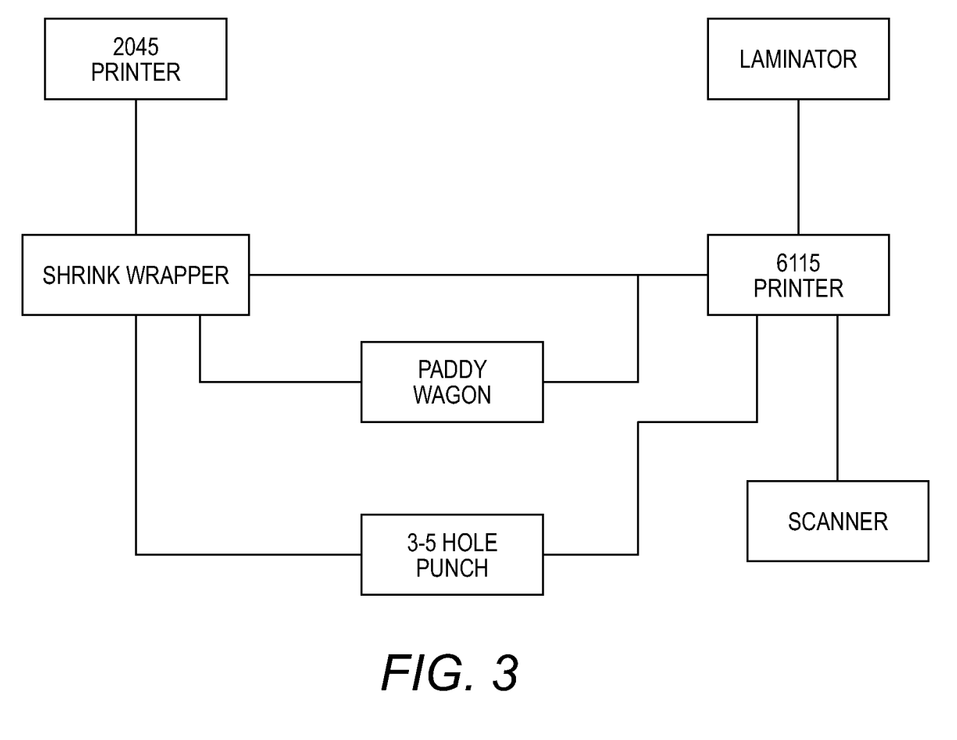
FIG. 3 illustrates an exemplary graph according to an embodiment.

In an embodiment, a node may have a shape of the station it represents. For example, a node representing a printer may have the shape or general appearance of the corresponding printer. Likewise, a node representing a scanner may have the shape or general appearance of the corresponding scanner. In an embodiment, the size of one or more nodes may be based on the size of the station it represents. In an embodiment, the size of one or more nodes may be proportional to the size of one or more other nodes in the graph. For example, a node of a graph may represent a printer, and another node of the graph may represent a hole puncher. If the actual size of the printer is larger than the actual size of the hole puncher, then the node representing the printer may be larger than the node representing the hole puncher.

In addition, the edges representing the flow between stations shown in a cell workflow graph may be replaced by edges representing paths between stations. In an embodiment, one or more edges of a graph may correspond to a distance between stations corresponding to the associated nodes. In an embodiment, the graph may include input and output points on the stations to which the edges may attach. FIG. 3 illustrates an exemplary graph corresponding to the cell workflow graph of FIG. 2 according to an embodiment.

In an embodiment, the visual depiction may be applied 125 to a floor plan associated with the cell. In an embodiment, a floor plan may depict physical features of the cell such as walls, windows, doors and/or the like. In an embodiment, the visual depiction may be automatically applied 125 to the floor plan such that the distance between each pair of stations does not exceed the target distance between each pair of stations. In an embodiment, the visual depiction may be automatically applied 125 to the floor plan such that the placement of the stations do not interfere with or conflict with the placement of physical features of the cell. For example, a station may be placed on the floor plan so that it does not block a doorway in the cell.

In an embodiment, the visual depiction may be applied 125 to the floor plan such that the placement of the stations conform with a service area associated with one or more stations. A service area is the amount of space around a station needed by service personnel to access and/or service the station. Typically, service personnel will not move a station in order to service the station, so placement of stations on a floor plan may take into account the service area associated with one or more stations. For example, a station may be placed a certain distance away from a wall or other obstruction to provide the necessary service area around the station. Likewise, stations may be placed a certain distance apart from one another to provide the necessary service area around the stations. In an embodiment, placement of a station may provide at least the service area corresponding to the station. For example, a station may require a service area of at least four feet on all sides of the station. As such, the station may be placed on a floor plan to provide four feet of space or more on all sides of the station.

In an embodiment, the service area may vary depending on the corresponding station. For example, the service area associated with a station only having one serviceable portion may differ from the service area associated with a station having more than one serviceable portion.

Figure 4:
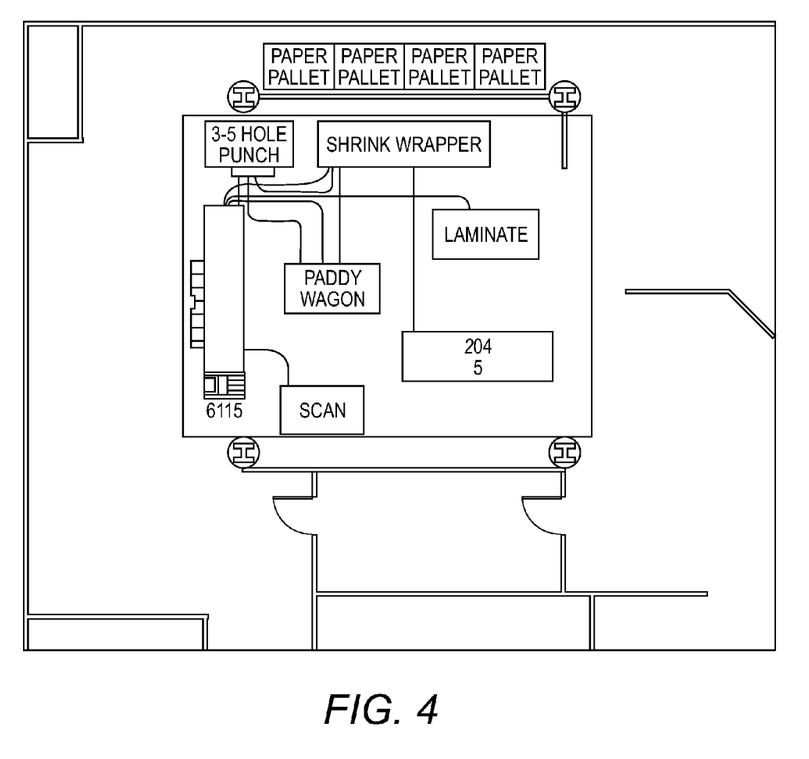
FIG. 4 illustrates an exemplary graph and floor plan according to an embodiment.

In an embodiment, the visual depiction and/or the floor plan may be displayed 130 to a user on a display device, such as, but not limited to, a computer monitor. FIG. 4 illustrates an exemplary visual depiction corresponding to the cell workflow graph illustrated in FIG. 2 as applied to a cell floor plan according to an embodiment.

In an alternate embodiment, the visual depiction may be applied 125 to a floor plan in a random or predefined placement. For example, the visual depiction may be applied 125 to the center of a floor plan, the top of a floor plan, the bottom of a floor plan and/or the like.

In an embodiment, a user may be enabled to change the location of one or more of the stations in the visual depiction. For example, a user may select a particular station and drag it to a different location on the floor plan. In an alternate embodiment, a user may enter coordinates of where a station should be moved, or may otherwise select a different placement for a station. In an embodiment, one or more edges between stations on the visual depiction may remain attached to the corresponding nodes when a station is moved. As a station is moved, the distance associated with one or more corresponding edges may be automatically recalculated and displayed to a user. In an embodiment, distances may be calculated using an A* algorithm or other distance calculation. In an embodiment, the distance calculation may factor in one or more physical features of the floor plan. For example, if two stations are located on opposite sides of a wall, the distance calculation may determine the distance between the stations that is around the wall and/or other physical features.

In an embodiment, one or more edges may be labeled based on the distance between the stations they connect. For example, one or more edges may be color coded, emboldened or otherwise distinguished based on the edge distance and the target distance for the edge between stations. Additional and/or alternate line attributes may be used within the scope of this disclosure.

In an embodiment, an edge associated with a distance greater than a target distance may be color coded red, and an edge associated with a distance less than a target distance may be color coded green. In an embodiment, the intensity, hue and/or the like may be varied to indicate how close a station placement is to an associated target distance. For example, the edge between two stations that is less than a target distance, but relatively close to the target distance, may have a darker shade of green than an edge having an associated distance that is significantly less than the target distance.

Figure 5:
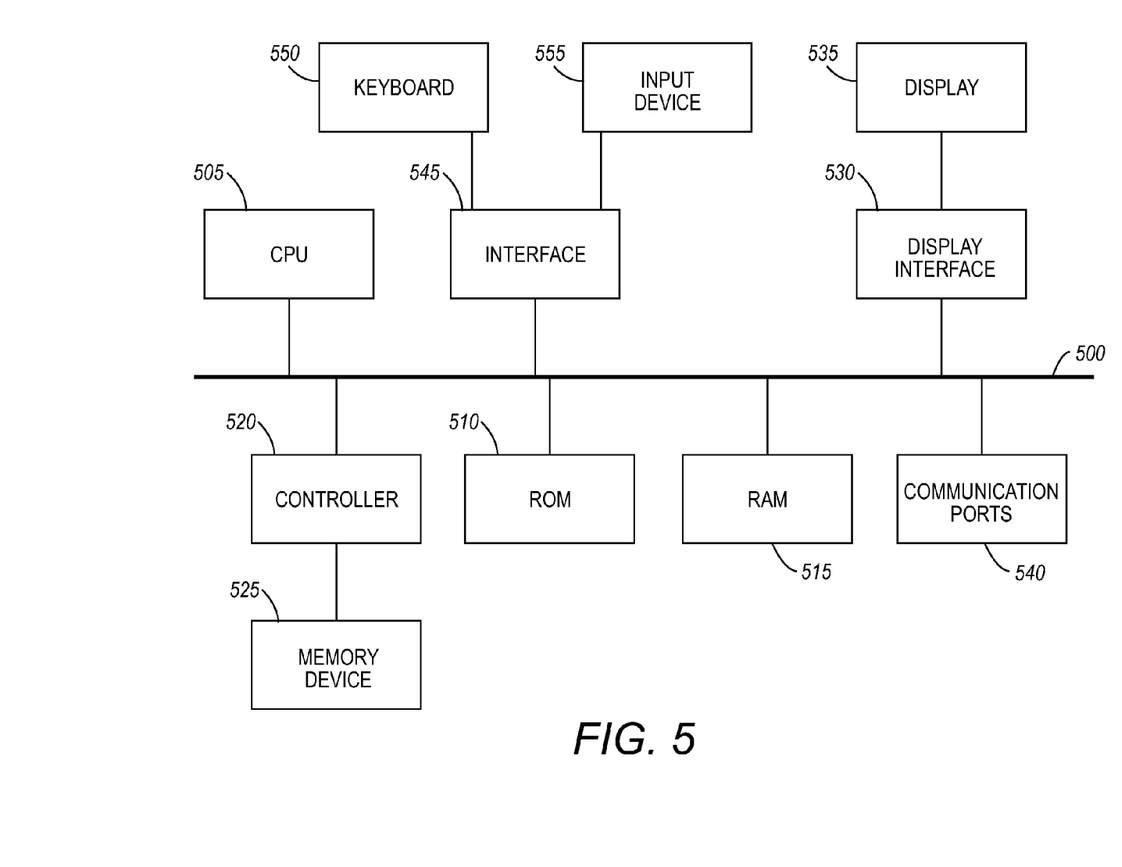
FIG. 5 illustrates a block diagram of exemplary internal hardware that may be used to contain or implement program instructions according to an embodiment.

FIG. 5 depicts a block diagram of exemplary internal hardware that may be used to contain or implement program instructions according to an embodiment. A bus 500 serves as the main information highway interconnecting the other illustrated components of the hardware. CPU 505 is the central processing unit of the system, performing calculations and logic operations required to execute a program. Read only memory (ROM) 510 and random access memory (RAM) 515 constitute exemplary memory devices.

A controller 520 interfaces with one or more optional memory devices 525 to the system bus 500. These memory devices 525 may include, for example, an external or internal Program instructions may be stored in the ROM 510 and/or the RAM 515. Optionally, program instructions may be stored on a tangible computer readable storage medium such as a compact disk, a digital disk, flash memory, a memory card, a USB drive, an optical disc storage medium, such as Blu-ray™ disc, and/or other recording medium.

An optional display interface 530 may permit information from the bus 500 to be displayed on the display 535 in audio, visual, graphic or alphanumeric format. Communication with external devices may occur using various communication ports 540. An exemplary communication port 540 may be attached to a communications network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

An embedded system, such as a sub-system within a xerographic apparatus, may optionally be used to perform one, some or all of the operations described herein. Likewise, a multiprocessor system may optionally be used to perform one, some or all of the operations described herein.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, all of which are also intended to be encompassed by the following claims.

What is claimed is:

1. A system for determining a location of stations in a cell of a job shop, the system comprising:
a computing device; and
a computer-readable storage medium in communication with the computing device, wherein the computer-readable storage medium comprises one or more programming instructions for:
receiving information corresponding to a workflow of a cell in a job shop, wherein the information comprises a plurality of print-related functions performable by the cell and an amount of work that flows between one or more pairs of print-related functions,
identifying a plurality of stations in the cell, wherein each station comprises one or more print production devices configured to perform one or more of the print-related functions performable by the cell, determining a target distance between one or more pairs of stations, wherein the target distance is based on at least the amount of work that flows between the pair of stations, wherein determining a target distance comprises determining:

$$D_i = (F_{max} - F_i)\left(\frac{D_{max} - D_{min}}{F_{max} - F_{min}}\right) + D_{min},$$

where: $D_i$ is the target distance,
$F_{max}$ is a maximum job volume between any two nodes in the cell workflow graph,
$F_i$ is a ob volume between nodes representative of the pair of stations,
$D_{max}$ is a maximum acceptable distance between an two nodes of the cell workflow graph,
$D_{min}$ is a minimum acceptable distance between an two nodes of the cell workflow graph, and
$F_{min}$ is a minimum job volume between any two nodes of the cell workflow graph,
generating a visual depiction of the identified stations,
automatically applying the visual depiction to a floor plan corresponding to the cell, based on one or more of the determined target distances, and
displaying the visual depiction as applied to the floor plan to a user.

2. The system of claim 1, wherein the one or more programming instructions further include one or more programming instructions for receiving one or more of a value of the maximum acceptable distance between nodes and a value of the minimum acceptable distance between nodes.

3. The system of claim 1, wherein the one or more programming instructions for identifying one or more stations in the cell comprise one or more programming instructions for mapping a plurality of the print-related functions in the received information to a print production device in the cell.

4. The system of claim 1, wherein the one or more programming instructions for identifying one or more stations in the cell comprise one or more programming instructions for mapping a print-related function in the received information to each print production device in the cell.

5. The system of claim 1, wherein the one or more programming instructions for generating a visual depiction comprise one or more programming instructions for generating a graph comprising:
a plurality of nodes, wherein each node corresponds to a different station in the cell, wherein each station is configured to perform at least one of the print-related functions identified in the cell workflow graph; and
one or more edges, wherein each edge represents a path between a pair of nodes.

6. The system of claim 1, wherein the one or more programming instructions for automatically applying the visual depiction to a floor plan comprise one or more programming instructions for applying the visual depiction to the floor plan such that:
a distance between each pair of stations does not exceed the target distance corresponding to the pair of stations; and
placement of the stations is based on a location of one or more physical structures identified in the floor plan.

7. The system of claim 1, wherein the one or more programming instructions for displaying the visual depiction to a user comprise one or more programming instructions for displaying a graph comprising:

a plurality of nodes, wherein each node corresponds to a different station in the cell; and one or more edges, wherein each edge represents a path between a pair of nodes, wherein a value associated with each edge corresponds to a distance between the pair of nodes, wherein a node is configured to be moved within the floor plan by a user.

8. The system of claim 7, wherein the one or more programming instructions for displaying a graph comprise one or more programming instructions for automatically re-calculating the distance between a pair of nodes when at least one of the nodes in the pair is moved.

9. The system of claim 1, wherein the one or more programming instructions for displaying the visual depiction to a user comprise one or more programming instructions for displaying a graph comprising:

a plurality of nodes, wherein each node corresponds to a different station in the cell; and one or more edges, wherein each edge represents a path between a pair of nodes, wherein each edge corresponds to a distance between the pair of nodes, wherein an attribute of one or more of the edges corresponds to a difference between the distance between the pair of nodes and the target distance between the pair of nodes.

10. The system of claim 1, wherein the one or more programming instructions for displaying the visual depiction to a user comprise one or more programming instructions for displaying a graph, wherein the graph comprises:

a plurality of nodes, wherein each node corresponds to a different station in the cell; and one or more edges, wherein each edge represents a path between a pair of nodes, wherein a value associated with each edge corresponds to a distance between the pair of nodes, wherein each edge having a distance that exceeds the target distance associated with the corresponding pair of nodes is shaded a first color, wherein each edge having a distance that does not exceed the target distance associated with the corresponding pair of nodes is shaded a second color.

11. The system of claim 10, wherein the one or more programming instructions for displaying the visual depiction comprise one or more programming instructions for displaying the graph, wherein one or more of the following varies based on a difference between the distance between the pair of nodes and the target distance associated with the pair of nodes:

a hue of the first color;
a hue of the second color;
an intensity of the first color; and
an intensity of the second color.

12. The system of claim 1, wherein the one or more programming instructions further comprise one or more programming instructions for generating a cell workflow graph comprising:

a plurality of nodes, wherein each node corresponds to one of the print-related functions, and one or more edges, wherein each edge corresponds to a pair of print-related functions, wherein a value associated with each edge corresponds to the amount of work that flows between the two associated print-related functions.

13. A system for determining a location of stations in a cell of a job shop, the system comprising:

a computing device; and a computer-readable storage medium in communication with the computing device, wherein the computer-readable storage medium comprises one or more programming instructions for:

receiving information corresponding to a workflow of a cell in a job shop, wherein the information comprises a plurality of print-related functions performable by the cell and an amount of work that flows between one or more pairs of print-related functions, identifying a plurality of stations in the cell, wherein each station comprises one or more print production devices configured to perform one or more of the print-related functions performable by the cell, determining a target distance between one or more pairs of stations, wherein the target distance is based on at least the amount of work that flows between the pair of stations, wherein determining a target distance comprises determining:

$$D_i = (F_{max} - F_i)\left(\frac{D_{max} - D_{min}}{F_{max} - F_{min}}\right) + D_{min},$$

where: $D_i$ is the target distance, $F_{max}$ is a maximum job volume between any two nodes in the cell workflow graph, $F_i$ is a job volume between nodes representative of the pair of stations, $D_{max}$ is a maximum acceptable distance between an two nodes of the cell workflow graph, $D_{min}$ is a minimum acceptable distance between an two nodes of the cell workflow graph, and $F_{min}$ is a minimum job volume between any two nodes of the cell workflow graph, generating a graph comprising one or more nodes and one or more edges, wherein each node corresponds to a different station in the cell, wherein each edge represents a path between a pair of nodes, wherein each edge corresponds to a distance between the pair of nodes, displaying the graph and a floor plan corresponding to the cell to a user, enabling the user to change a position of one or more of the nodes and the edges of the graph on the floor plan.

14. The system of claim 13, wherein the one or more programming instructions further include one or more programming instructions for receiving, from a user, one or more of a value of the maximum acceptable distance between nodes and a value of the minimum acceptable distance between nodes.

15. The system of claim 13, wherein the one or more programming instructions for displaying the graph to a user comprise one or more programming instructions for displaying the graph, wherein the one or more edges comprise an attribute that corresponds to a difference between the distance between the pair of nodes and the target distance between the pair of nodes.

16. The system of claim 13, wherein the one or more programming instructions for displaying the graph to a user comprise one or more programming instructions for displaying the graph, wherein each edge having a distance that exceeds the target distance associated with the corresponding pair of nodes is shaded a first color, wherein each edge having a distance that does not exceed the target distance associated with the corresponding pair of nodes is shaded a second color.

17. A system for determining a location of stations in a cell of a job shop, the system comprising:

a computing device; and a computer-readable storage medium in communication with the computing device, wherein the computer-readable storage medium comprises one or more programming instructions for:

receiving information corresponding to a workflow of a cell in a job shop, wherein the information comprises a plurality of functions performable by the cell and an amount of work that flows between one or more pairs of functions, identifying a plurality of stations in the cell, wherein each station comprises one or more production devices configured to perform one or more of the functions performable by the cell, determining a target distance between each unique pair of stations, wherein the target distance is based on at least the amount of work that flows between the pair of stations, wherein determining a target distance comprises determining:

$$D_i = (F_{max} - F_i)\left(\frac{D_{max} - D_{min}}{F_{max} - F_{min}}\right) + D_{min},$$

where: $D_i$ is the target distance $F_{max}$ is a maximum job volume between any two nodes in the cell workflow graph, $F_i$ is a job volume between nodes representative of the pair of stations, $D_{max}$ is a maximum acceptable distance between an two nodes of the cell workflow graph, $D_{min}$ is a minimum acceptable distance between an two nodes of the cell workflow graph, and $F_{min}$ is a minimum job volume between any two nodes of the cell workflow graph, generating a visual depiction of the identified stations, automatically applying the visual depiction to a floor plan corresponding to the cell based on one or more of the determined target distances, and displaying the visual depiction as applied to the floor plan to a user.

18. The system of claim 17, wherein the one or more programming instructions further comprise one or more programming instructions for generating a cell workflow graph comprising:

a plurality of nodes, wherein each node corresponds to one of the functions, and one or more edges, wherein each edge corresponds to two associated functions, wherein a value associated with each edge corresponds to the amount of work that flows between the two associated functions.

19. The system of claim 17, wherein the one or more programming instructions for automatically applying the visual depiction to a floor plan comprise one or more programming instructions for applying the visual depiction to the floor plan such that:

a distance between each pair of stations does not exceed the target distance corresponding to the pair of stations; and placement of the stations is based on a location of one or more physical structures identified in the floor plan.

* * * * *